US010620630B2

(12) United States Patent
Salter et al.

(10) Patent No.: US 10,620,630 B2
(45) Date of Patent: Apr. 14, 2020

(54) MOVING VEHICLES ON AND OFF TRANSPORT CARRIAGES

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Annette Lynn Huebner, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 217 days.

(21) Appl. No.: 15/685,317

(22) Filed: Aug. 24, 2017

(65) Prior Publication Data

US 2019/0064809 A1    Feb. 28, 2019

(51) Int. Cl.
| G05D 1/00 | (2006.01) |
| G05D 1/02 | (2020.01) |
| B60W 10/04 | (2006.01) |
| B60W 10/20 | (2006.01) |
| B60W 30/18 | (2012.01) |
| B61D 3/18 | (2006.01) |

(52) U.S. Cl.
CPC .......... *G05D 1/0088* (2013.01); *B60W 10/04* (2013.01); *B60W 10/20* (2013.01); *B60W 30/18009* (2013.01); *B61D 3/18* (2013.01); *G05D 1/028* (2013.01); *G05D 1/0219* (2013.01); *G05D 1/0234* (2013.01); *G05D 1/0285* (2013.01); *B60W 2400/00* (2013.01); *B60W 2720/24* (2013.01); *B60W 2750/40* (2013.01); *G05D 2201/0213* (2013.01)

(58) Field of Classification Search
CPC .. G05D 1/0088; G05D 1/0219; G05D 1/0285; G05D 2201/0213; G05D 1/0234; G05D 1/028; G05D 1/0225; B60W 10/04; B60W 10/20; B60W 30/18009; B60W 2400/00; B60W 2720/24; B60W 2750/40; B60W 30/06; B61D 3/18; B61D 47/005; B65G 69/30; G08G 1/0968
USPC .................................................... 701/23, 25
See application file for complete search history.

(56) References Cited

U.S. PATENT DOCUMENTS

| 8,038,381 | B2 | 10/2011 | Boettcher et al. | |
| 8,784,034 | B2 | 7/2014 | Lert, Jr. et al. | |
| 9,139,363 | B2 | 9/2015 | Lert | |
| 2010/0104392 | A1* | 4/2010 | Bowen | B60P 3/08 410/26 |
| 2017/0355295 | A1* | 12/2017 | Gutowitz | B60P 3/07 |

FOREIGN PATENT DOCUMENTS

| DE | 3616484 A1 | 11/1987 |
| DE | 10210829 A1 | 9/2003 |
| DE | 102015202468 A1 | 8/2016 |
| TW | M446349 U1 | 2/2013 |

* cited by examiner

*Primary Examiner* — Nadeem Odeh
(74) *Attorney, Agent, or Firm* — Frank A. MacKenzie; Bejin Bieneman PLC (57) ABSTRACT

A method that includes a computer in a vehicle. The method includes: controlling an approach to a pivotable bridge that spans between two transport carriages or between one of the carriages and a vehicle loader; receiving, from a communication device coupled to the bridge or one of the carriages, an indication to cross the bridge; and based on the indication, crossing the bridge.

20 Claims, 8 Drawing Sheets

MOVING VEHICLES ON AND OFF TRANSPORT CARRIAGES

BACKGROUND

Vehicles typically need to be relocated upon manufacture. For example, groups of new vehicles typically are shipped to different parts of the country or world so that they may be sold locally. Relocation may require human operators to drive vehicles one-by-one onto and/or off of a transport.

DETAILED DESCRIPTION

A vehicle loading and unloading system is described that includes a computer server, a network of communication devices (e.g., some of which may be located on transport carriages), and one or more vehicles in wireless communication with the server and the communication devices. According to one illustrative example, a method is described that can include, at a computer in a vehicle: controlling an approach to a pivotable bridge that spans between two transport carriages or between one of the carriages and a vehicle loader; receiving, from a communication device coupled to the bridge or one of the carriages, an indication to cross the bridge; and based on the indication, crossing the bridge.

According to the at least one example set forth above, the computer is programmed to operate the vehicle in a fully autonomous mode.

According to the at least one example set forth above, the first and second transport carriages are railroad cars.

According to the at least one example set forth above, the device is carried by a contact region of the bridge.

According to the at least one example set forth above, the device comprises a Bluetooth Low Energy chipset which transmits the indication.

According to the at least one example set forth above, the indication is received at the computer based on proximity sensor data that indicates contact between the one of the carriages and the bridge in a deployed position.

According to the at least one example set forth above, the indication further comprises a unique identifier.

According to the at least one example set forth above, the method further includes determining to cross the bridge based on an indication that the bridge is in a deployed position.

According to the at least one example set forth above, the method further includes: to inventory the vehicle, transmitting a vehicle identifier to a server in communication with the device.

According to another illustrative example, a method is described that can include, at a server: receiving a first identifier of a first communication device, which device is part of a network of communication devices coupled to a plurality of transport carriages; receiving a second identifier of a vehicle being loaded or unloaded from the carriage(s); and determining a location of the vehicle based on the identifiers.

According to the at least one example set forth above, determining the location includes determining upon which of the plurality of transport carriages the vehicle is, upon which carriage level of the respective transport carriage the vehicle is, or both.

According to the at least one example set forth above, the method further includes, at the server: receiving a third identifier of a second communication device, which device is part of the network and which second communication device is coupled to a vehicle loader for loading or unloading a plurality of vehicles onto the plurality of transport carriages; and determining a location of the vehicle based on the third identifier.

According to the at least one example set forth above, the method further includes, at the server: determining that the vehicle is parked at the location; and updating an inventory registry with the location.

According to the at least one example set forth above, the first identifier is received based on the first communication device being in contact with a portion of an adjacent transport carriage.

According to another illustrative example, the method further includes receiving at the server a plurality of identifiers each associated with a different one of the network of communication devices; and based on receiving the plurality of identifiers, tracking a current location of the vehicle.

According to the at least one example set forth above, the vehicle is operating in a fully autonomous mode as it is loaded or unloaded.

According to the at least one example set forth above, the method further includes determining whether a bridge which carries the first communication device is moving toward a deployed position or toward a stowed position.

According to another illustrative example, a computer is described that can include a processor and memory storing instructions executable by the processor. The instructions may include, to: control an approach of a vehicle to a pivotable bridge that spans between one of: two transport carriages, or a vehicle loader and one of the carriages; receive, from a first communication device coupled to the bridge or one of the carriages, an indication to cross the bridge; and based on the indication, cross the bridge.

According to the at least one example set forth above, a system is described that includes the computer and a server programmed to: determine a location of the vehicle based on communication between it and a plurality of communication devices which include the first communication device, wherein each device is coupled to a different bridge.

According to the at least one system example set forth above, the system further may include a vehicle loader that includes one of the plurality of communication devices coupled to a bridge thereof, wherein, when the loader bridge is in the deployed position, the vehicle may be loaded or unloaded from one of the carriages.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a vehicle loading and unloading system 10 that includes a computer server 12, a wireless network 14 of communication devices 44, and one or more autonomous vehicles 18 in wireless communication with the server 12. The server 12 may instruct the vehicles 18 to board or un-board a transport carriage 20 (e.g., via a vehicle loader 22). While the vehicle 18 boards (or un-boards), the server 12 may track a current location of the vehicle 18 using data received from the network 14 of communication devices 44. The server 12 may repeat this process with other vehicles 18 and inventory the vehicles 18 as they are loaded or unloaded from the carriage(s) 20. Each autonomous vehicle 18 may be programmed to navigate onto the loader 22 and to navigate from the loader 22 onto a first transport carriage 20A by crossing a bridge 24. Thereafter, the vehicle 18 may park itself on the first transport carriage 20A or may cross a similar bridge 24 (located on the first transport carriage 20A) and thereby travel onto an adjacent transport carriage 20B. Here again, the vehicle may park itself or cross a similar bridge 24 (located on the second transport carriage 20B) and thereby travel onto the next adjacent transport carriage 20C. This sequence may occur repeatedly until the vehicle 18 eventually parks itself on one of the carriages 20. Additional vehicles 18 may be loaded onto the transport carriages 20, and the carriages 20 may travel (e.g. being towed) to a delivery destination. At the destination, a similar process may be executed using the computer server 12 (or a similar server) so that the autonomous vehicle(s) 18 may be unloaded from the transport carriage(s) 20.

According to one non-limiting example, the transport carriages 20 are train or railroad cars and typically dozens or scores of train cars may be coupled as part of a single train. As will be explained more below, each train car may have a bridge (24) which extends to an adjacent car.

According to a conventional technique, a vehicle is loaded onto the train by an operator driving the car up a vehicle loader, crossing a first bridge, and driving onto the first train car. Thereafter, the operator may drive the vehicle toward the front of the train by crossing multiple bridges interstitially-located between adjacent train cars. Then, the operator parks the vehicle and then backtracks (e.g., sometimes on foot) from the train car (where the vehicle was parked) to the vehicle loader (at the rear of the train) and similarly loads another vehicle onto the train. This backtracking distance will vary depending upon the parked location of the vehicle; however, in some examples, the operator may backtrack approximately a mile. This process is simply reversed when unloading vehicles. Accordingly, loading or unloading the train may be time-consuming endeavor.

The present disclosure may be conducted with fewer operators and less operator-interaction as the vehicles 18 drive themselves onto the train carriages 20. Using the vehicle loading and unloading system 10 described herein, server 12 may control the interstitially-located bridges 24 (e.g., moving them between a stowed position and a deployed position), identify whether any of the bridges 24 have not been properly deployed, determine the location of each of the autonomous vehicles 18 on the train, and maintain a current onboard inventory. A train implementation wherein transport carriages are exemplified as train cars is merely one example and is used for illustration purposes only. Other non-limiting examples, include marine transport vessels, aircraft transport vehicles, and semi- or tractor-trailer trucks (which may or may not have multiple trailers).

Thus, according to at least one example, the vehicle loading and unloading system 10 comprises a plurality of transport carriages 20 (e.g., embodied as train cars) and a vehicle loader 22 that is adapted to load and unload vehicles 18 from or via a first carriage 20A (at the rear end of the train). According to one example, each carriage 20 may be identical; therefore, only one will be explained.

Transport carriage 20 comprises a container 30 having one or more levels L1, L2 therein. In the illustrations, carriage 20 has two levels (however, three-level and other multi-level implementations are also possible). Each level L1, L2 may comprise a floor 32 which may be comprised of a pair of tracks (not shown) sized and spaced to accommodate a plurality of different vehicle wheel-bases. A rear end 34 of the carriage 20 may be open or comprise a door or gate (not shown), and a front end 36 of the carriage 20 may comprise a bridge 24 which is coupled to and which pivots with respect to floor 32.

Figure 3:
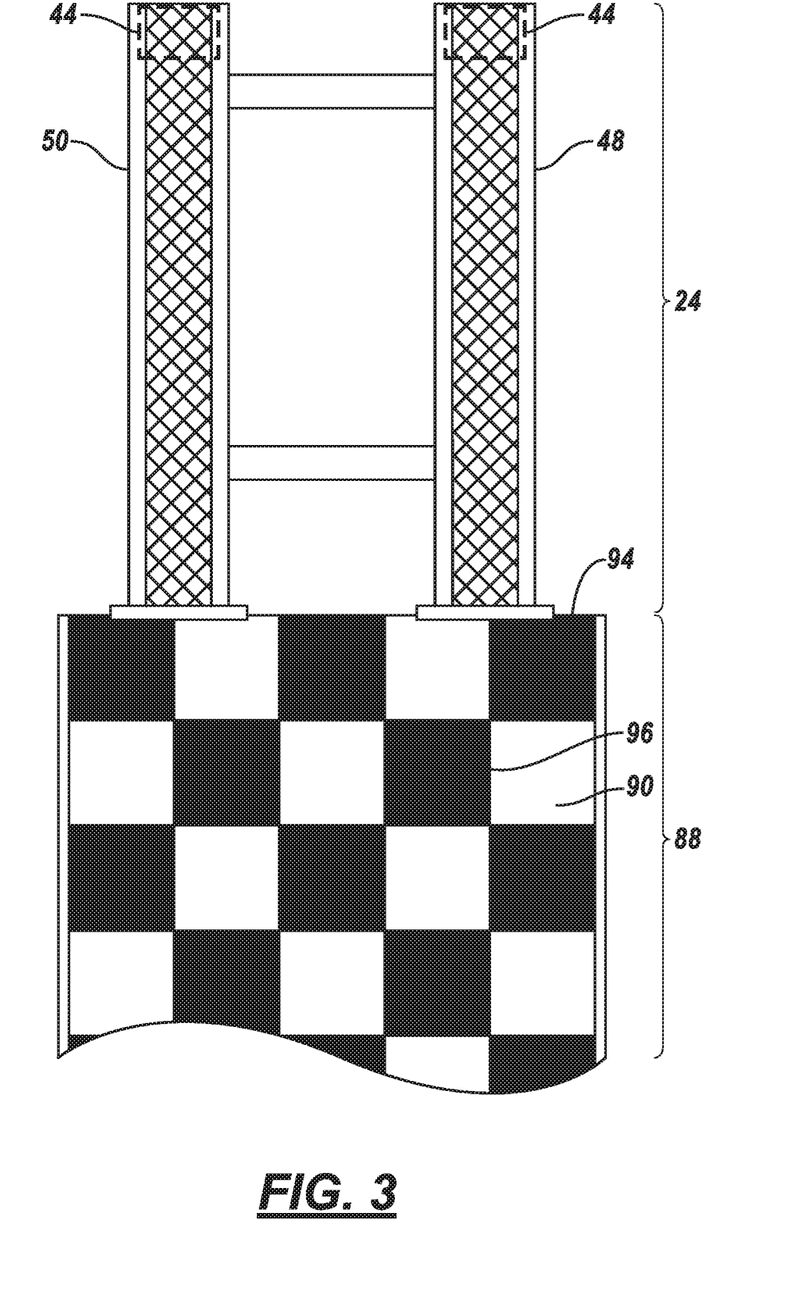
FIG. 3 is a top view of a portion of a vehicle loader that comprises a ramp and a vehicle bridge.
Figure 4:
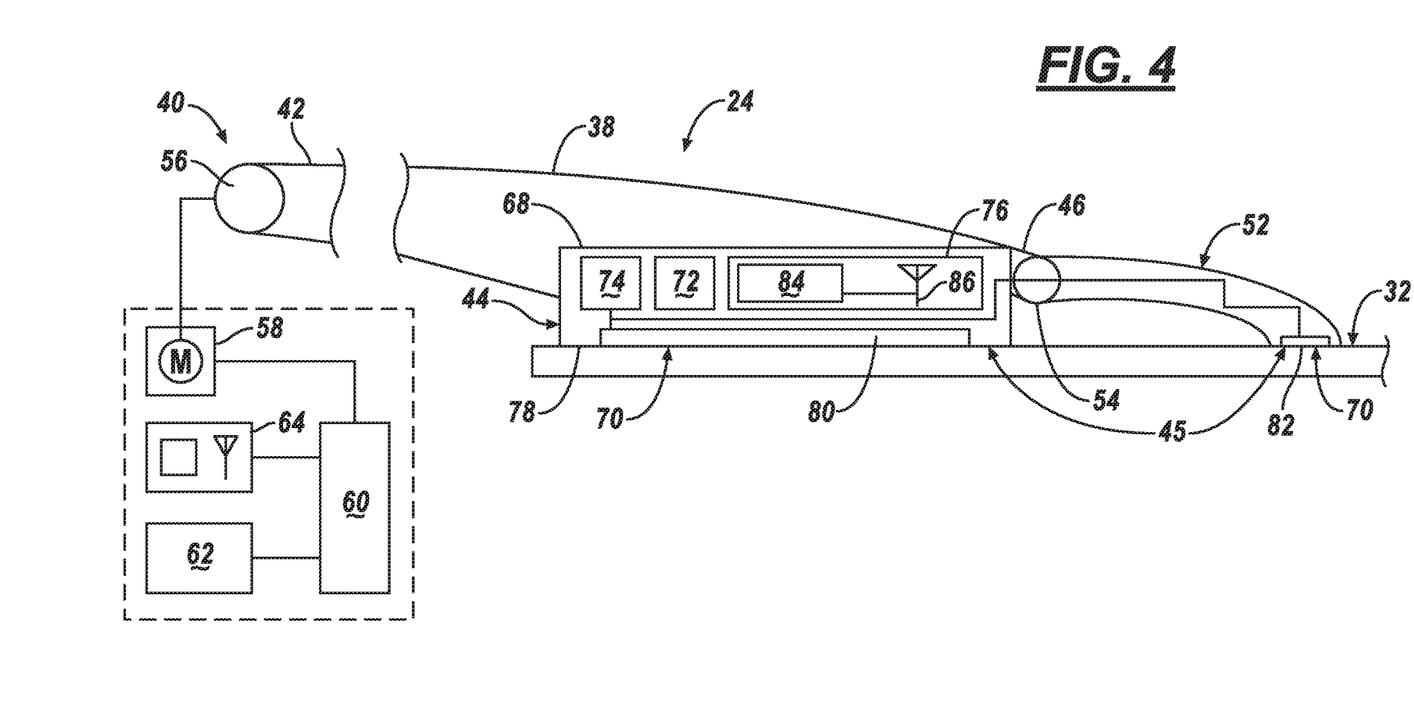
FIG. 4 is a schematic side view of the bridge.

As best shown in FIG. 4, the bridge 24 may comprise a base 38, a pivotal member 40 coupling the respective carriage 20 and the base 38 near a first end 42 (of the base), and a communication device 44 located in a contact region 45 (e.g., near a second end 46 of the base 38). The base 38 may be any suitable platform having a length adequate to extend from the pivotal member 40 to an adjacent transport carriage 20—e.g., thereby supporting the weight of a vehicle 18 driving over the bridge 24 (e.g., and permitting the vehicle 18 to move from one carriage to an adjacent carriage). In the illustrations, the base 38 comprises two tracks 48, 50 (FIG. 3) which may be coupled together to move in unison; however, this is merely an example.

According to one example (FIG. 4), a toe portion 52 extends from second end 46 of the base 38—e.g., being coupled to the base via a second pivotal member 54 (e.g., such as a hinge or the like). As will be explained more below, when the bridge 24 moves from a stowed position (e.g., pivoted upwardly) to a deployed position (e.g., pivoted downwardly), the toe portion 52 may contact the floor 32 of the adjacent carriage first, followed by the base 38. And when the bridge 24 moves from the deployed position to the stowed position, the base 38 may first be raised from the floor 32 (of the adjacent carriage), followed by the toe portion 52. Using sensors described below, this hinged arrangement may be used to confirm the directional movement of the bridge 24 (e.g., up or down).

The pivotal member 40 may include one or more hinges 56 and a motor 58 to move the bridge 24, via the member 40, between the stowed and deployed positions. In one example, the member 40 further comprises a processor 60, memory 62, and a wireless transceiver 64. The memory 62 may store instructions executable by the processor 60 which include receiving an instruction, from the server 12 via transceiver 64, to move the bridge 24. In this manner, the bridge 24 may be remotely controlled. However, this is not required; e.g., the bridge 24 manually may be stowed or deployed, may be controlled by an operator of the train, may move based on communication with autonomous vehicles 18, or the like, just to name a few non-limiting examples.

The communication device 44 may perform two functions: communicating with autonomous vehicles 18, and determining contact between the bridge 24 and an adjacent transport carriage floor 32. In addition, as will be explained more below, multiple communication devices 44 may operate as a wireless network 14; thus, communication device 44 may be adapted and configured to communicate wirelessly with wireless repeaters 66 (which amplify a wireless signal (FIG. 1)) and other similarly-constructed communication devices (e.g., on the train, as part of infrastructure, etc.). According to at least one example, the device 44 may comprise a housing 68 that carries a proximity sensor 70, memory 72, a processor 74, and a wireless transceiver 76. The housing 68 may comprise a bracket or enclosure, and the proximity sensor 70 may be located at a bottom wall 78 thereof (e.g., on an inside of the wall 78, an outside of the wall 78, or through an opening in the wall 78).

The proximity sensor 70 may be any electronic device which detects contact between the communication device 44 (or the sensor 70 itself) and the floor 32 of an adjacent carriage 20 when the bridge 24 is in the deployed position. For example, transport carriages 20 may contain chains, tie-downs, even trash or the like which could interfere with establishing contact between the bridge 24 and the floor 32. For example, these and other obstructions could become trapped between the bridge 24 and the floor 32 of the adjacent carriage 20 as the bridge 24 moves to the deployed position. This may result in the bridge 24 not being in full contact with the floor 32, and in this undeployed position, it may be undesirable for the vehicles 18 to cross as doing so may cause damage to the transport carriage 20, the vehicle 18, service personnel, etc. Thus, the proximity sensor 70 may be used to provide a signal (e.g., proximity sensor data to the processor 74) which is indicative of contact with the floor 32. Thus, as used herein, a deployed position pertains to a bridge 24 extending between a first transport carriage and a second transport carriage, wherein, in the deployed position, a portion of the bridge 24 is in flush contact with a portion of the second transport carriage.

One non-limiting example of a proximity sensor 70 is a capacitive sensor which provides a signal greater than a predetermined threshold when in contact with metal plates and brackets which may form the floor 32 of the train car. In another example, the proximity sensor 70 comprises two sensing elements 80, 82 (each providing an independent signal to processor 74), wherein one of elements 80 (a first element) is located in the base 38 (as described above) and a second element 82 is located in the toe portion 52. These elements 80, 82 also could be capacitive sensors; however, this is not required. Each element 80, 82 may provide a signal greater than the predetermined threshold when the bridge 24 is in the deployed position. However, when the bridge 24 begins to move from the deployed position to the stowed position, the signal from the first element 80 may drop below the predetermined threshold (as the base 38 is lifted from the floor 32) while the second element 82 may continue to provide a signal greater than threshold (as the toe portion 52 remains flush to the floor 32). As the bridge 24 is raised farther, both signals may drop below the threshold (as the toe portion 52 also is lifted from the floor 32). This delay or lag between the two independent signals may be used to confirm that the bridge 24 is being raised.

Similarly, when the bridge 24 is being lowered from the stowed position toward the deployed position, the second element 82 may provide a signal which exceeds the predetermined threshold before a signal from the first element 80, as the toe portion 52 may contact the floor 32 of the adjacent transport carriage 20 before the base 38 of the bridge 24 does. Thereafter, the base 38 (and first element 80) may contact the floor 32, and then a signal from the first element 80 may exceed the threshold as well. This delay between the two independent signals may be used to confirm that the bridge 24 is being lowered. In this manner, two sensing elements 80, 82 may be used to confirm the directionality of the bridge movement (e.g., without cameras or human operators having line-of-sight).

Other proximity sensor types and configurations are possible. For example, the proximity sensor 70 may comprise one or more Hall effect or other magnetic sensors, one or more ultrasonic sensors, one or more infrared sensors, one or more gyroscopic sensors or other orientation sensors, etc., just to name a few.

Memory 72 of the communication device 44 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 72 may store one or more computer program products which may be embodied as software, firmware, or the like. In addition, memory 72 may store a unique identifier of the communication device 44.

The processor 74 of the communication device 44 may be any type of device capable of processing electronic instructions, non-limiting examples including a microprocessor, a microcontroller or controller, an application specific integrated circuit (ASIC), etc.—just to name a few. In general, communication device 44 may be programmed to execute digitally-stored instructions, which may be stored in memory 72, which enable the communication device 44 (via processor 74), among other things: to determine whether the bridge 24 is in the deployed position or stowed position; to determine whether the bridge 24 is being raised or lowered; to communicate with other communication devices 44; and/or to communicate with one or more autonomous vehicles 18.

Wireless transceiver 76 may comprise a wireless chipset 84 and matched antenna 86. The chipset 84 may communicate via any suitable frequency and according to any suitable protocol. In at least one example, the chipset 84 and antenna 86 operate at a short-range wireless communication frequency and according to Bluetooth Low Energy (BLE); however, this is not required (e.g., it could utilize Bluetooth, Wi-Fi, or some other wireless protocol instead).

In at least one example, a communication device 44 is located on each track 48, 50 of the bridge 24 (e.g., see FIG. 3). In such examples, the two devices 44 may function as a single unit. For example, each track 48, 50 may comprise a proximity sensor (70) and the communication devices 44 may not report a deployed position unless both proximity sensors indicate flush contact with the floor 32 of the adjacent transport carriage 20. Further, each device 44 may be associated with a single identifier (e.g., a bridge identifier or BID). This is merely one example; other arrangements are possible.

Figure 1:
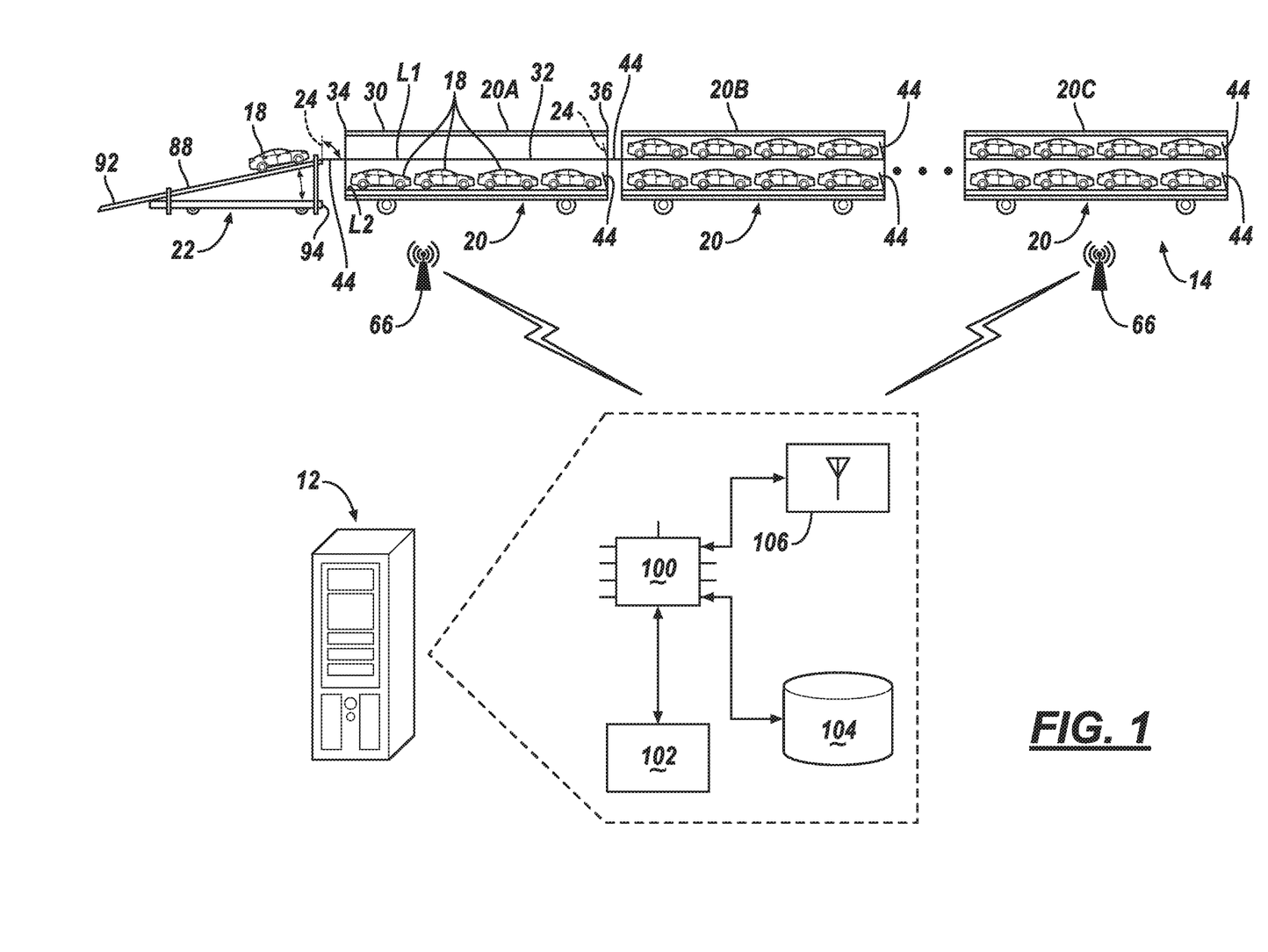
FIG. 1 is a schematic view of an exemplary transport system that includes a plurality of autonomous vehicles in communication with a computer server.
Figure 2:
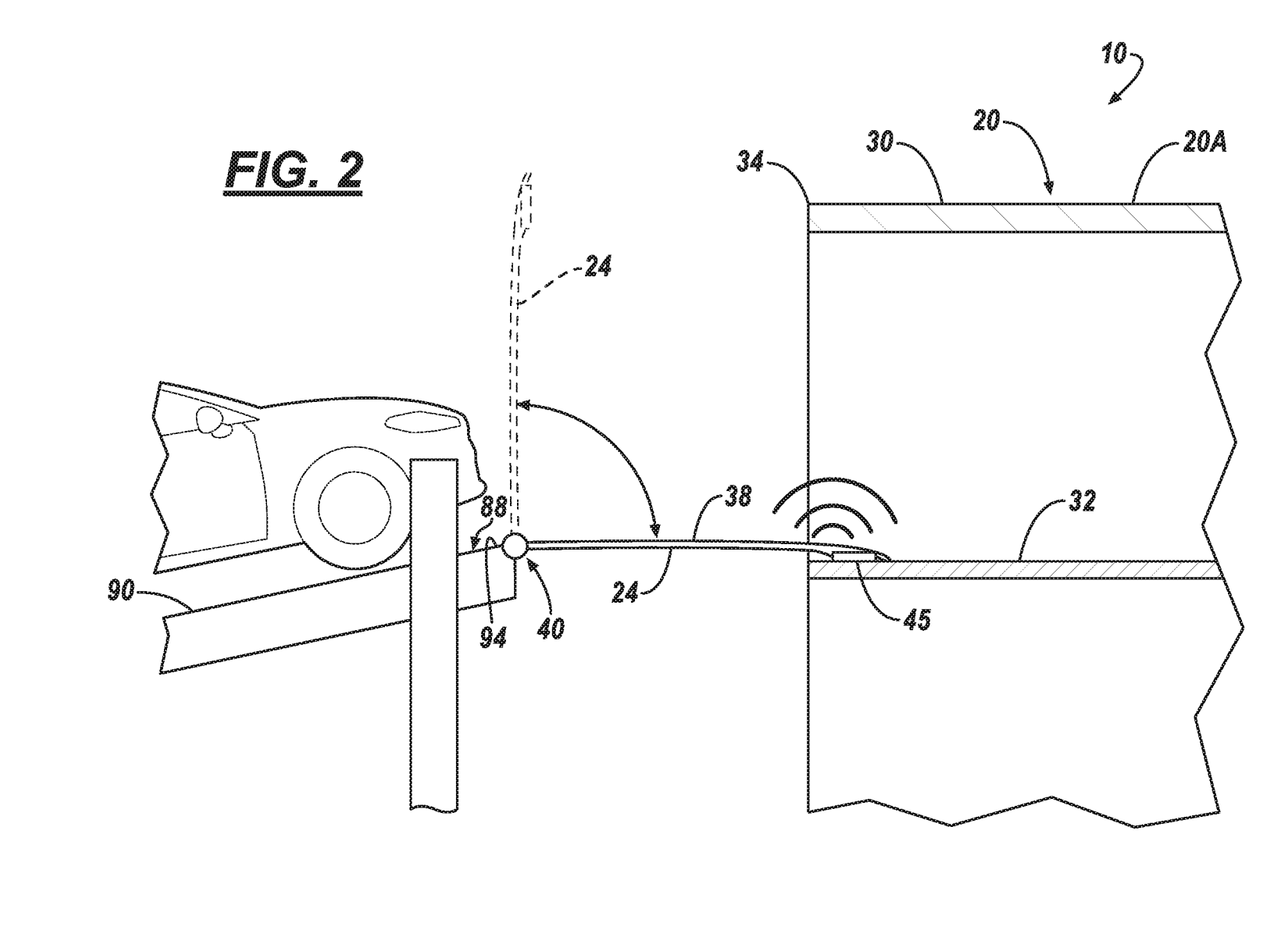
FIG. 2 is an enlarged view of a portion of FIG. 1.

Turning now to the vehicle loader 22 shown in FIGS. 1-2, as used herein, a vehicle loader is any structure suitable for loading and/or unloading vehicles 18 onto transport carriage(s) 20. The loader 22 may comprise a ramp 88 and a bridge (e.g., such as bridge 24). According to one example, the ramp 88 comprises a sloped surface 90. For example, a first end 92 of the loader 22 may be near the ground and the ramp 88 may be supported by stanchions which raise and lower a second end 94 relative to the first end 92. According to one example, the second end 94 may be moved between a first position that corresponds with the lower level L1 of the transport carriage 20 and a second position that corresponds with the upper level L2 of the transport carriage 20. In some examples, the second end 94 may be moved to a third position (e.g., between the first and second levels)—e.g., that corresponds with a middle level on a transport carriage 20 (not shown).

Figure 8:
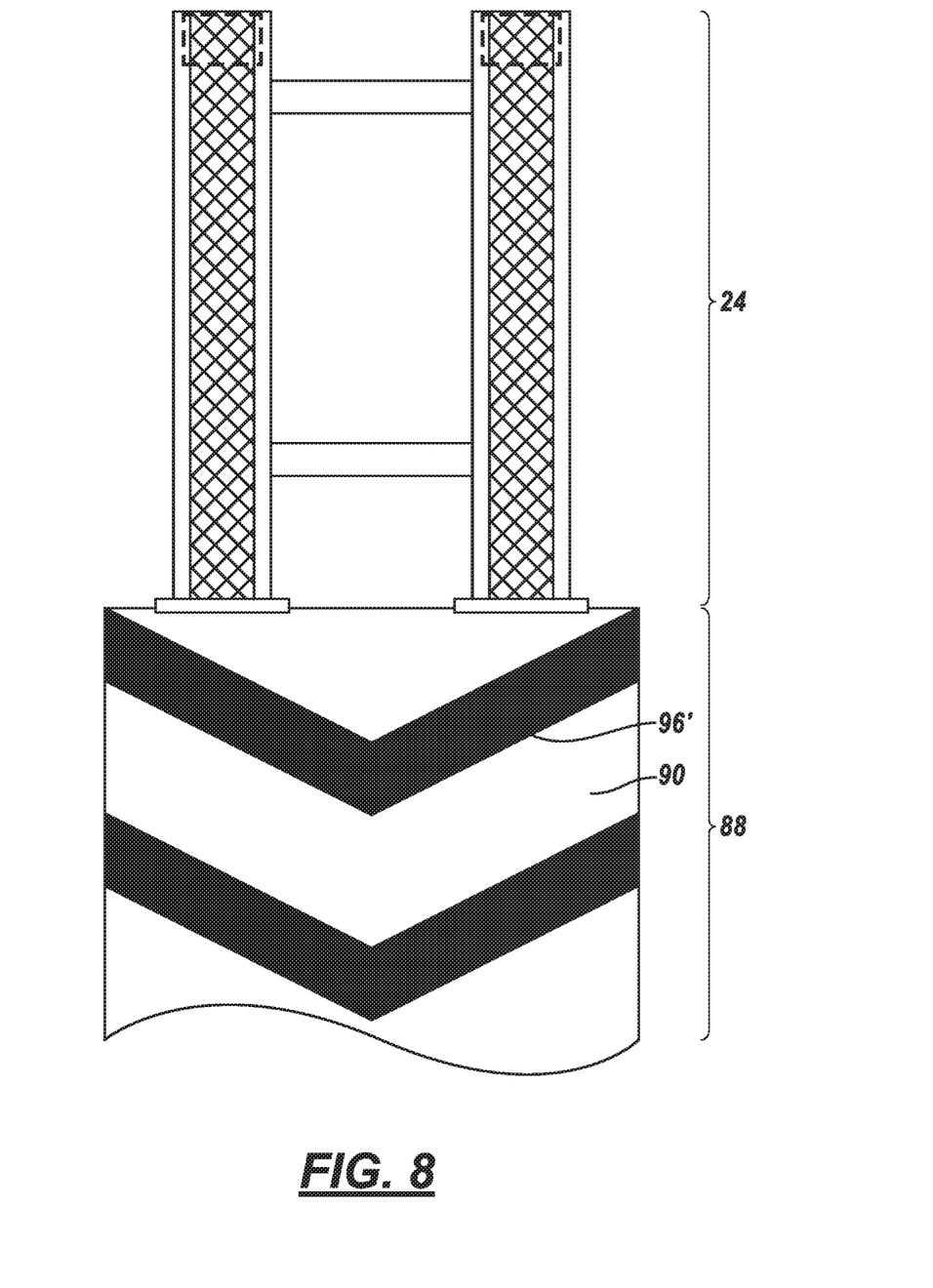
FIG. 8 illustrates another example of the vehicle loader.

FIG. 3 illustrates an optically-recognizable pattern 96 on surface 90 of the ramp 88 which may be used by an autonomous vehicle 18 to navigate onto and across the ramp 88. Here, the pattern 96 is a checker board having alternating light and dark squares—e.g., a high-contrast image suitable for an imaging system on the vehicle 18 to identify a route or path across the ramp 88. This is merely one example, and other exist (e.g., including the chevron pattern 96' shown in FIG. 8).

According to at least one example, the bridge of the loader 22 may be identical to the bridges 24 of the transport carriages 20; therefore, it will not be described in great detail here. The bridge 24 of the loader may extend outwardly from the second end 94 so that when the loader 22 is positioned proximate an end carriage 20A (e.g., of the train), the bridge 24 extends onto the floor 32 of carriage 20A (similar to that described above).

Other examples of vehicle loaders exist. For example, instead of a ramp, the loader may comprise a lift which translates along a vertical axis. The lift may comprise the optically-recognizable pattern to facilitate autonomous vehicle movement along its length. And at one end of the lift, a similarly-constructed bridge 24 may extend therefrom.

Turning now to the computer server 12 shown in FIG. 1, the server 12 may comprise a single computer (or multiple computing devices—e.g., shared with other manufacturing or shipping plant systems and/or subsystems). In at least one example, server 12 is a logistics server which identifies outgoing or incoming shipments of vehicles 18; however, this is merely an example. Server 12 may comprise a processor 100 coupled to memory 102. For example, processor 100 can be any type of device capable of processing electronic instructions, non-limiting examples including a microprocessor, a microcontroller or controller, an application specific integrated circuit (ASIC), etc.—just to name a few. In general, server 12 may be programmed to execute digitally-stored instructions, which may be stored in memory 102, which enable the server 12, among other things: to selectively control bridge movement (e.g., between the stowed and deployed positions); to confirm that bridges 24 are in the deployed positions prior to instructing vehicles 18 to board or unboard; to selectively instruct autonomous vehicles 18 to board (or unboard) transport carriages 20; etc.

Memory 102 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 102 may store one or more computer program products which may be embodied as software, firmware, or the like.

Server 12 further may comprise a database 104 coupled to processor 100 that stores vehicle inventory data. As used herein, inventory data comprises a plurality of unique vehicle identifiers and the respective vehicles' locations. A location may include a storage facility (e.g., owned or controlled by a vehicle manufacturer), with a particular shipper (e.g., including onboard a train, ship, plane, etc.), and/or onboard a transport carriage 20 or onboard a particular transport carriage 20, etc. Location may include carriage identifier and/or a level (e.g., L1, L2) identifier.

Server 12 further may comprise a wireless transceiver 106 coupled to processor 100. In at least one example, the transceiver 106 may be identical to transceiver 76; therefore, it will not be re-described here.

The transceiver 106 of computer server 12, the communication device(s) 44 of the loader 22, and the communication device(s) 44 of the transport carriages 20 may be in communication via wireless network 14. According to one example, each of these devices 44, 106 may operate according to a common frequency band and protocol (e.g., such as BLE). As discussed above, each of the communication devices 44 may have a unique identifier (e.g., bridge identifiers (BIDs)); transceiver 106 also may have a unique identifier (e.g., a server identifier (SID)). The wireless network 14 may operate as a mesh network—e.g., thereby extending the range of communication to all proximately located devices; and repeaters 66 may be used within the network 14 as necessary.

Messaging between the server 12 and communication devices 44 may include the SID and/or BID identifiers so that the sender and recipient are identified. For instance, a message sent from the server 12 to a communication device 44 may comprise a header having two identifiers (e.g., the identifier of the sending device (in this case, the SID) and the identifier of the intended recipient (in this case, one of the BIDs)). In this manner, the message may be relayed among the communication devices 44 and only the intended recipient may act or take notice of a payload of the message; the payload may comprise an alert, instruction, etc. In this manner, a distantly-located communication device 44 (e.g., toward the front of a train) may communicate with the server 12, device 44 in the loader 22, and/or communication devices 44 nearer the loader 22.

Figure 5:
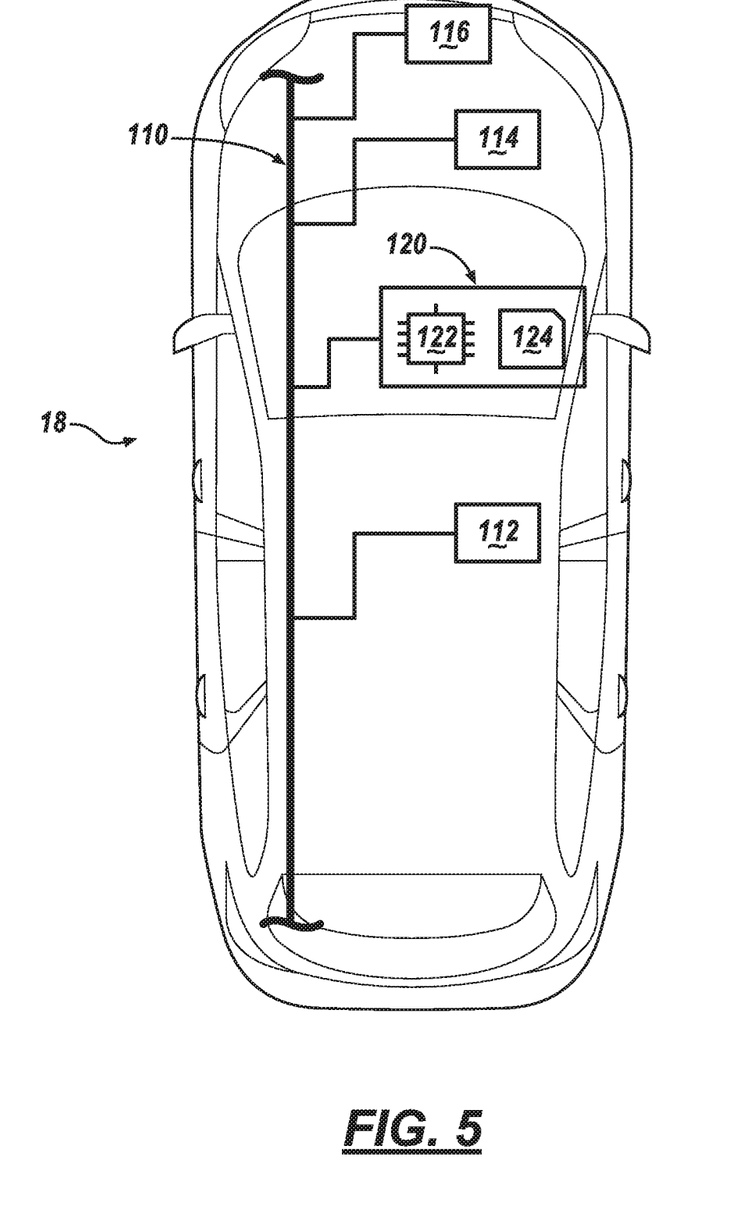
FIG. 5 is a schematic view of one of the plurality of autonomous vehicles.

Referring to FIG. 5, the vehicle 18 is shown as a passenger car; however, vehicle 18 could also be a truck, sports utility vehicle (SUV), recreational vehicle, bus, train, marine vessel, aircraft, or the like that forms a portion of system 10. Vehicle 18 may be operated in any one of a number of autonomous modes. In at least one example, vehicle 18 operates in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 18. For example, at level 0 ("no automation"), a human driver is responsible for all vehicle operations. At level 1 ("driver assistance"), the vehicle 18 sometimes assists with steering, acceleration, or braking, but the driver is still responsible for the vast majority of the vehicle control. At level 2 ("partial automation"), the vehicle 18 can control steering, acceleration, and braking under certain circumstances without human interaction. At levels 3-5, the vehicle 18 assumes more driving-related tasks. At level 3 ("conditional automation"), the vehicle 18 can handle steering, acceleration, and braking under certain circumstances, as well as monitoring of the driving environment. Level 3 may require the driver to intervene occasionally, however. At level 4 ("high automation"), the vehicle 18 can handle the same tasks as at level 3 but without relying on the driver to intervene in certain driving modes. At level 5 ("full automation"), the vehicle 18 can handle all tasks without any driver intervention. Thus, as described above, in the fully autonomous mode, the vehicle 18 may be instructed to move itself onto the vehicle loader 22 and onto one or more of the transport carriages 20. Further, for each bridge 24 that the vehicle 18 approaches and intends to cross, the autonomous vehicle 18 may verify that the bridge 24 is in the deployed position—e.g., by communicating with the respective communication device 44 and/or the server 12 via the wireless network 14. Thus, in the fully autonomous mode, the vehicle 18 may board the transport carriages 20, park the vehicle 18, and switch its ignition state to OFF. Further, while operating in a sleep or low power mode, the vehicle 18 may receive an indication to WAKE UP, actuate its ignition state to ON, place its transmission in DRIVE (or REVERSE), and unboard the transport carriages 20 (e.g., again verifying that each respective bridge 24 is in the deployed position before crossing it).

A number of vehicles 18 may be loaded or unloaded from the transport carriages 20. Each vehicle 18 may be identical; therefore, only one will be described. Vehicle 18 may comprise, among other things: a wired or wireless network connection 110, a telematics device 112, a powertrain and steering system 114, an imaging system 116, and one or more autonomous driving computers 120 (e.g., one is shown for purposes of illustration). As discussed above, the vehicle 18 may store a unique vehicle identifier (VID) which is used by the server 12 and/or communication devices 44 to message the particular vehicle 18. The VID may be a vehicle identification number (VIN), a telematics device serial number, microprocessor serial number, or the like (which may be stored in any suitable memory).

Network connection 110 may facilitate intra-vehicle communication between the telematics device 112, powertrain and steering system 114, imaging system 116, computer 120, and any other suitable electronic device. In at least one example, the connection 110 includes one or more of a controller area network (CAN) bus, Ethernet, Local Interconnect Network (LIN), a fiber optic connection, or the like. Other examples also exist. For example, alternatively or in combination with e.g., a CAN bus, connection 110 could comprise one or more discrete wired or wireless connections.

Telematics device 112 may be any computing device configured to wirelessly communicate with other electronic devices. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art. According to one example, device 112 includes a processor, memory, an embedded BLE chipset, and at least one matched antenna. The telematics device 112 may be provided auxiliary vehicle battery power when the vehicle ignition state is OFF so that the device 112 may operate in a low power mode. For example, in this mode, the telematics device 112 may wake up from a sleep mode and listen for an incoming wireless signal according to a predetermined interval while all or most of the remainder of the vehicle 18 is powered down (e.g., the interval may be 1-2 seconds in duration, while the listening period may be 100-200 milliseconds of that 1-2 seconds). When the telematics device 112 receives an incoming message having the VID, the telematic device 112 may wake up other vehicle systems—e.g., wake up computer 120, powertrain and steering system 114, and/or the remainder of the vehicle 18. In this manner, the vehicle 18 may be parked in a vehicle parking lot, receive an instruction to board the transport carriages 20, and then autonomously act on the boarding instruction. Similarly, in this manner, the vehicle 18 may be parked on the transport carriages 20, receive an instruction to unboard the transport carriage(s) 20, and then autonomously act on the unboarding instruction.

Powertrain and steering system 114 may include any mechanical and/or electrical components which facilitate propulsion and braking of vehicle 18, steering the directionality of vehicle 18, or the like. This system 114 may include a combustion, electric, or hybrid engine. Further, system 114 may include an automatic transmission coupled to the engine, and also a chassis which supports the vehicle body and controls turning of the wheels. The system 114 may include one or more computers which receive instructions from computer 120; in response to these instructions, the system 114 may change the ignition state to ON or OFF, autonomously operate the vehicle 18 causing it to board or unboard the loader 22 and/or transport carriages 20, etc.

Imaging system 116 may include one or more sensors (not shown) which may be used to navigate and otherwise operate the vehicle 18 in the fully autonomous mode. For example, the sensors may include laser identification detection and ranging (LIDAR) devices, radio detection and ranging (RADAR) devices, and day cameras (e.g., complementary metal oxide semiconductor (CMOS) devices, charge-coupled devices (CCDs), image intensifiers (so-called i-squared devices), etc.), just to name a few examples. The imaging system 116 also may comprise one or more computers (not shown) programmed with instructions, algorithms, etc. to: receive sensor data; use the sensor data to identify a roadway, driving path, or the like; and/or identify obstacles and other vehicles, and the like. Image data from cameras may be combined, overlaid, stitched, etc. with RADAR and/or LIDAR data to develop a three-dimensional map of the area surrounding the vehicle 18, and this map may be used by computer to drive the vehicle 18 in the fully autonomous mode. Image data may be combined with so-called localization data (e.g., predefined or previously-acquired three-dimensional mapping data) to reduce computational time and increase vehicle situational awareness, accuracy, etc. Using the imaging system 116, computer 120 may identify the pattern 96 on the surface 90 of the vehicle loader ramp 88, the tracks 48, 50 of the bridge(s) 24, the inner walls of the container 30 (of the transport carriage 20), and other vehicles 18 (e.g., including those parked on the same level (e.g., L1, L2) of the carriage 20—e.g., in front of approaching vehicle 18).

Computer 120 of vehicle 18 may comprise a processor 122 that executes instructions stored in memory 124 to autonomously control movement of the vehicle 18, as well as communicate with the server 12 and communication devices 44. Processor 122 can be any type of device capable of processing electronic instructions, non-limiting examples including a microprocessor, a microcontroller or controller, an application specific integrated circuit (ASIC), etc.—just to name a few. In general, computer 120 may be programmed to execute digitally-stored instructions, which may be stored in memory 124, which enable the computer 120, among other things: receive an instruction from server 12 to board or unboard a transport carriage 20; navigate autonomously onto or off of the carriage 20 (e.g., via vehicle loader 22); use the pattern 96 on the loader 22 to center the vehicle 18 on the loader surface 90; approach one or more bridges 24 (e.g., on the loader 22 or on one of the transport carriages 20); receive an indication from the communication device 44 on the respective bridge 24 indicating whether the bridge is in the deployed position; cross the bridge 24 based on the indication; and determine whether to PARK the vehicle 18.

Memory 124 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 124 may store one or more computer program products which may be embodied as software, firmware, or the like.

Figure 6:
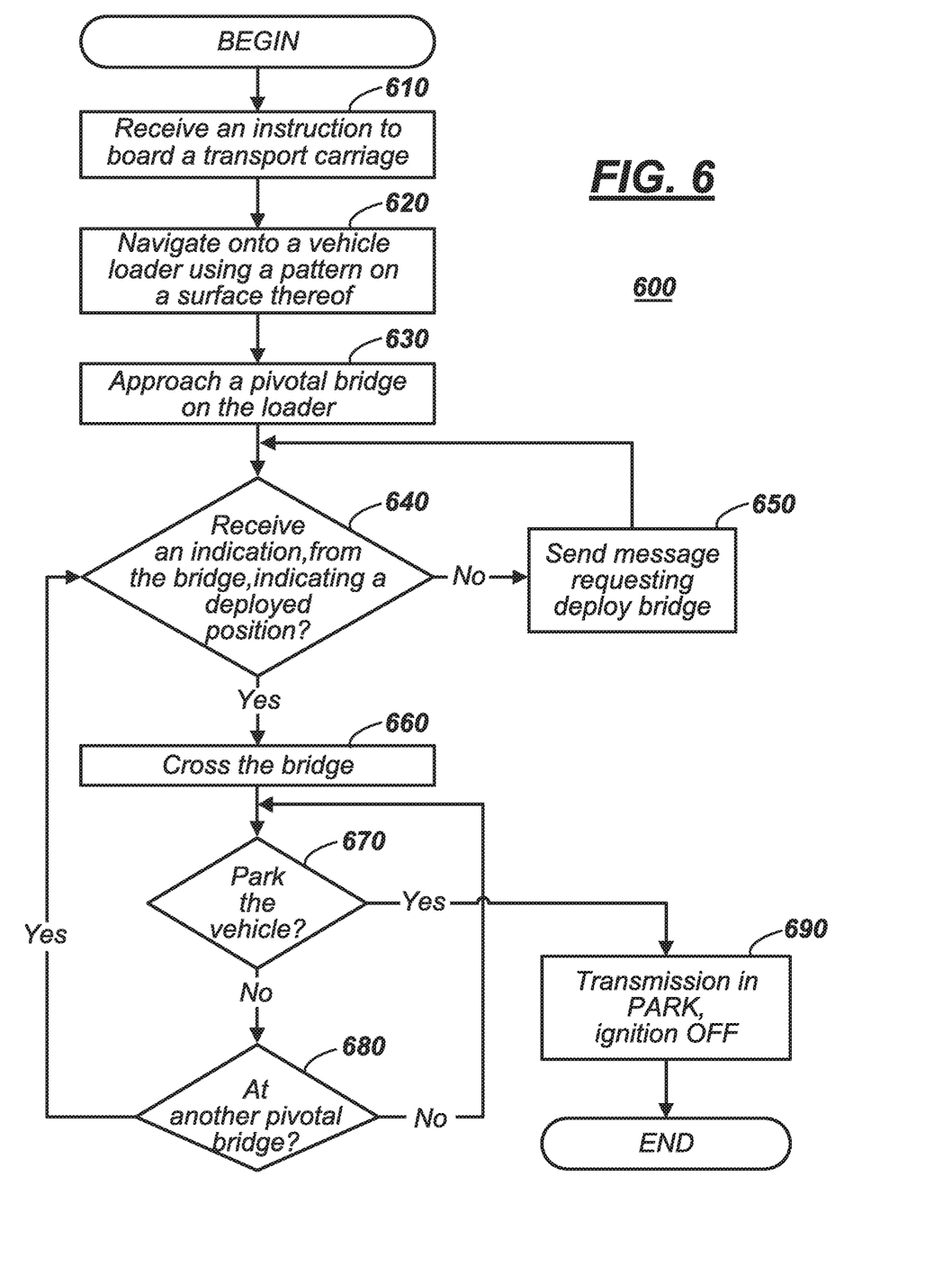
FIG. 6 is a flow diagram of a process of operating an autonomous vehicle.

Turning now to FIG. 6, an instructional process 600 carried out by computer 120 of the autonomous vehicle 18 is illustrated. The process is an example of how the vehicle 18 may use the system 10 to board the transport carriage(s) 20 while communicating with the server 12 and communication devices 44 described above. The process begins with block 610 wherein the vehicle 18 receives via the telematics device 112 an instruction to board one of the transport carriages 20. When the instruction is received, the vehicle 18 may be parked, and/or the vehicle's ignition state may be OFF. According to the illustrated example, a number of vehicles (like or identical to vehicle 18) are being loaded onto a train having a plurality of transport carriages 20 (train cars). The vehicles 18 may be in a low power mode (e.g., in a parking lot or structure) and may receive an instruction from the server 12 to board the carriage(s) 20. In at least one example, this instruction may be received over a short-range wireless communication protocol such as BLE. When the server 12 is out-of-range of the vehicle 18, the instruction may be relayed using wireless repeaters 66 or the like.

In at least one example of block 610, a wireless message is transmitted by the server 12 having a header that includes the SID and a VID of the particular vehicle 18 and also comprises a payload header that includes a command (e.g., an instruction to PARK the vehicle at a location onboard a carriage 20). The location may be defined using a specific bridge identifier (BID). According to at least one example, the server 12 may anticipate the vehicle 18 parking on a carriage 20 once it crosses a bridge 24 having that particular BID. This implementation is not required in all examples.

In block 620, in response to the instruction (block 610), the vehicle 18 may proceed to navigate onto the specific transport carriage 20. For example, using the powertrain and steering system 114, the vehicle 18 may move in a fully autonomous mode toward and onto the vehicle loader 22. Upon reaching the loader 22, the vehicle 18 may receive image data from its imaging system 116 that identifies the contrast pattern 96 on the surface 90 of the ramp 88. Using the pattern 96 and image processing techniques, computer 120 may control vehicle 18 to move up the ramp 88 without driving off the sides thereof (or striking against the rails thereof).

In block 630, using the image data, the vehicle 18 may approach the bridge 24 of the loader 22. For example, computer 120 can identify the second end 94 of the ramp 88 (e.g., where the contrast pattern 96 terminates). As vehicle 18 approaches the second end 94, it may communicate with the bridge's respective communication device 44 to determine whether the bridge 24 is in the deployed position. In some examples, vehicle 18 may pause momentarily; in other examples, communication may be sufficiently rapid that vehicle 18 does not need to stop.

In block 640, vehicle 18 (via telematics device 112) may receive and computer 120 may determine whether it has received an indication that the bridge 24 is in a deployed position. According to one example, the respective communication device 44 may determine whether the proximity sensor 70 provides an output larger than a predetermined threshold (e.g., indicating contact with the floor 32 of the adjacent carriage 20). In other examples, device 44 may determine whether both elements 80, 82 are providing a signal larger than respectively predetermined thresholds, as discussed above. Regardless of how the communication device 44 determines the deployed position, it communicates this to vehicle 18 via a wireless message (e.g., that may include the VID and BID). When the device 44 does not provide an indication (no communication) or indicates a state other than the deployed position, process 600 may proceed to block 650, and when an indication of the deployed position is received, the process 600 may proceed to block 660.

The payload of the message in block 640 may be binary—e.g., indicating one of a deployed position or something else. For example, for purposes of this disclosure, there may be no partially deployed position. As discussed above, any vehicle 18 attempting to cross a bridge 24 when the bridge 24 is not in contact with the floor 32 may result in damage to the vehicle 18, the bridge 24, the transport carriage 20, etc.

It should be appreciated that while on the ramp 88, the vehicle 18 may be within wireless range of a number of signals sent from different communication devices 44. According to one example, the vehicle 18 may identify its location based on a received signal strength indication (RSSI) from the respective devices 44 and/or based on a digital map stored in memory 126 (e.g., the vehicle 18 may recognize where it is on the train based on a mapping of bridge locations).

In at least one example, the indication received in block 640 may be in response to the device 44 receiving a query message from the vehicle telematics device 112. In other examples, the respective communication device 44 may provide the indication without such a query. For instance, in one example, the device 44 repeatedly could transmit the indication when the bridge 24 is in the deployed position. In another example, device 44 may sense the proximity of the vehicle 18 (e.g., based on a beacon or other suitable signal sent out from the telematics device 112), and provide a message indicating whether it is in the stowed or deployed position. Still other examples exist.

In block 650, the telematics device 112 could send a message requesting deployment of the bridge 24—e.g., through the network 14 of communication devices 44 and ultimately be received by the server 12. Alternatively, the telematics device 112 could provide the message to the respective communication device 44, and it could transmit the message to the server 12. For example, the communication device 44 may receive an indication from the vehicle 18 that it intends to cross the corresponding bridge 24 and concurrently determine that the bridge 24 is not in the deployed position; and based on these determinations, communication device 44 may send the message to the server 12.

In block 660, the vehicle 18 may cross the bridge 24 after receiving an indication from the communication device 44 that the bridge 24 is in the deployed position (block 640). For example, computer 120 may prompt the powertrain and steering system 114 to move the vehicle 18 over the bridge 24 and onto the adjacent transport carriage 20.

In block 670 which follows, computer 120 may determine whether to park the vehicle 18. For instance, in at least one example, the vehicle 18 may have received block 610 instruction to park the vehicle on a particular transport carriage 20. If the vehicle 18 is now in this location, computer 120 may instruct the powertrain and steering system 114 to place the vehicle transmission in PARK and the ignition state to OFF.

According to another example of block 670, the powertrain and steering system 114 may move the vehicle 18 through multiple transport carriages 20 and across multiple bridges 24 until the computer 120 identifies another parked vehicle immediately in front of vehicle 18 (e.g., using imaging system 116). If computer 120 determines not to park vehicle 18 yet, then the process proceeds to block 680. And if the computer determines to park vehicle 18 at this time, then the process proceeds to block 690.

In block 680, the powertrain and steering system 114 may control the movement of the vehicle 18 as it begins to travels the length of the respective transport carriage 20. If the vehicle 18 reaches the second end 36 of the respective transport carriage (another bridge 24), the process 600 loops back to block 640. As the vehicle 18 moves forwardly, the process may loop back and repeat block 670—e.g., and computer 120 may re-determine whether to park the vehicle 18 or not.

In block 690, having determined to park the vehicle 18, computer 120 instructs the powertrain and steering system 114 to place the vehicle transmission in PARK and switch the ignition state to OFF. Thereafter the method ends.

Process 600 illustrates a scenario wherein the vehicle 18 is boarding the transport carriage(s) 20 via loader 22. A similar set of instructions may be executed by computer 120 during an unboarding process. For example, the telematics device 112 may receive an instruction from server 12 (or a similar server at the train's destination) instructing the vehicle 18 to wake up and place the ignition state to ON. The instruction could identify a parking lot or parking space location where the vehicle 18 should drive, place the transmission in PARK, and then place the ignition state again to OFF. Thus, in at least some examples, in response to the instruction, computer 120 may communicate wirelessly with communication devices 44 on the transport carriage and loader bridges 24 in a similar manner, as described above—e.g., receiving an indication that the bridge 24 is in the deployed position from each respective communication device 44 before the vehicle 18 moves in REVERSE over the bridge.

Figure 7:
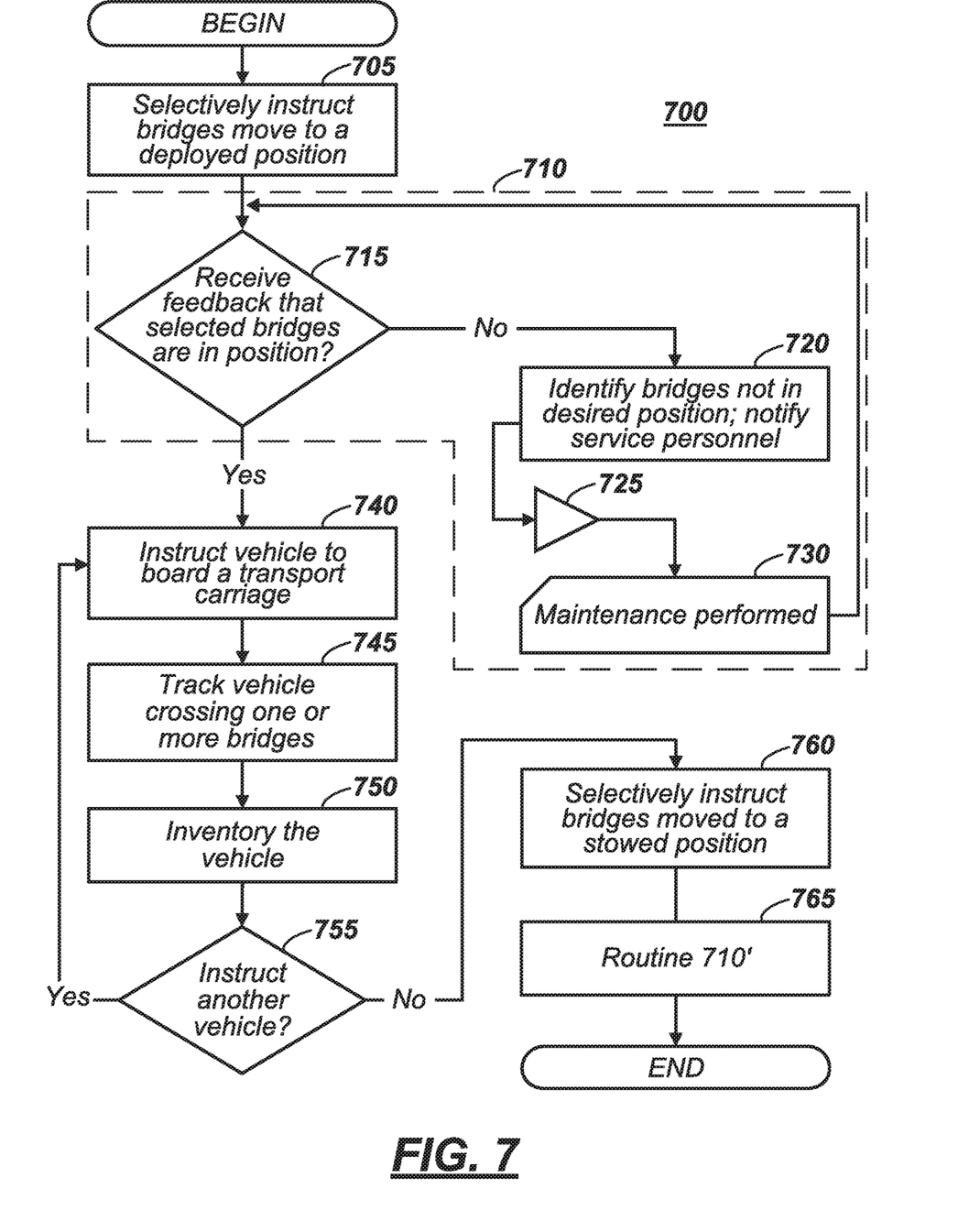
FIG. 7 is a flow diagram of a process of loading vehicles onto a transport carriage.

Turning now to FIG. 7, an instructional process 700 carried out by the server is illustrated. The process is an example of how the server 12 may instruct autonomous vehicles (e.g., such as vehicle 18) to board or unboard the transport carriage(s) 20 based on communication with the communication devices 44 and/or respective vehicles.

The process may begin with block 705, wherein the server 12 selectively instructs one or more bridges 24 to move to the deployed position. According to one example, the server 12 commands are bridges 24 to the deployed position via the wireless network 14; in other examples, the deployment or stowage of bridges is controlled by the transport (e.g., controlled using by a train operator or the like). In at least some examples, only some of the transport carriages 20 will receive vehicles 18. And in such instances, server 12 may selectively actuate only some corresponding bridges 24.

In block 710, the server 12 may receive feedback as to whether the selectively actuated bridges 24 are deployed. Block 710 comprises block 715, block 720, block 725, and block 730.

In block 715, via the wireless network 14 of communication devices 44, the server 12 receives feedback as to whether the selectively-actuated bridges 24 have moved to the desired (e.g., deployed) position. For example, each selectively-actuated bridge 24 (or the communication device 44 thereof) may transmit through the wireless network 14 a message that comprises a header (having a SID and a BID) and a payload message (e.g., indicating whether the bridge is in the deployed position or not—e.g., according to the binary implementation described above). Upon receipt of the messages, server 12 may record the BID and the corresponding state of the bridge 24 (e.g., stowed or deployed) in a look-up table, data array, etc. If server 12 determines at least one bridge 24 to not be in the deployed position, process 700 proceeds to block 720. If, however, all of the selectively-actuated bridges 24 are in the deployed position, the process proceeds to block 740.

In block 720, the server 12 may identify the bridge(s) 24 not in the desired position. In this particular instance, server identifies bridge(s) 24 not in the deployed position (which were previously actuated)—e.g., using the transport carriage mapping technique (described above). In response to the identification, server 12 may notify authorized service personnel so that they may attend to the apparent fault or malfunction. Notification may be via an output on a display (not shown) connected to server 12, via wireless text message, or the like.

In block 725, the process 700 may pause for a predetermined duration to enable service personnel to address the fault. As discussed above, the fault may be due to tie-downs, chains, trash, or other obstructions inhibiting the particular bridge 24 from making flush contact with the floor 32 of the adjacent transport carriage 20.

In block 730, the service personnel may perform the requisite maintenance—e.g., by removing the obstruction, repairing the bridge 24, etc. In some instances, the motor 58, hinge 56, or the like may be inoperative—e.g., causing the malfunction. Since service personnel may identify which bridge 24 of a plurality of transport carriages 20 have a fault or malfunction using the output of the server 12, repair or service time may be expedited.

Following block 730, the process may loop back and repeat block 715. In this instance, if all bridges 24 are now in the desired (deployed) position, the process may proceed to block 740. If the same bridge or another bridge 24 remains in the undesired position, then process may repeat blocks 720, 725, 730, and 715.

In block 740, the server 12 may instruct the vehicle 18 to board a transport carriage 20. As described above, this instruction may identify a particular transport carriage. This may or may not include boarding a predetermined level (e.g., L1, L2) of the particular transport carriage 20. In other examples, the instruction anticipates that the vehicle 18 will navigate through one or more carriages 20 (and across one or more bridges 24) until it finds a suitable location to PARK—these and other examples of the vehicle instruction were previously described in process 600 and will not be re-described here in great detail.

In block 745 which follows, the server 12 may track a current location of the vehicle 18 as it crosses one more bridges 24 (e.g., of the loader 22 and/or transport carriages 20). Continuing with the example above, the vehicle 18 may cross a number of bridges 24 each having its own respective communication device 44; based on receiving notifications from the respective communication devices 44, server 12 may know the location of the vehicle 18 as it moves through the train.

In block 750, which may occur at any suitable time during process 700, server 12 may perform logistics services by inventorying the vehicle 18 (e.g., in a digital inventory registry). For example, in the registry, the server 12 may associate a vehicle identifier (e.g., the VID) with a boarded condition. Further, the vehicle identifier may be associated with a particular transport system (e.g., a particular train) and/or a particular transport carriage 20 (e.g., of the train) upon which the vehicle 18 is parked.

According to at least one example, the server 12 may receive a message via the network 14 from the vehicle 18 that the vehicle is parked. This message may comprise location information (e.g., identifying one or more of: which carriage 20 the vehicle 18 is in, which level (e.g., L1, L2) the vehicle 18 is on, which bridge 24 (and communication device 44) the vehicle 18 last passed over, etc.). This location information may be used by server 12 to update the vehicle inventory registry.

Process may proceed to block 755, wherein server 12 may determine whether to instruct another vehicle 18 to board one of the transport carriages 20. Of course, blocks 705-755 may occur repeatedly. Further, multiple vehicles 18 may be boarded concurrently. According to one example, the vehicles 18 may act as a caravan or convoy of vehicles boarding the transport carriages 20. If additional vehicle(s) are to be instructed, process 700 loops back to block 740 and issues the additional instruction(s). However, if no additional vehicles 18 are to be instructed to board, then the process proceeds to block 760.

In block 760, the server 12 selectively may instruct the bridge(s) 24 to move to a stowed position (e.g., to prepare for the train departure). Typically, at this time, maintenance personnel may secure each boarded vehicle 18 with locks, chains, tie-downs, etc., and in some instances, the personnel manually may move the bridge(s) 24 to the stowed position. Or, as described above, the bridge(s) 24 selectively may be moved between the deployed and stowed position using onboard train operator controls.

Regardless of how the bridges 24 are moved to the stowed position, in at least one example, process 700 includes block 765 which repeats the set of instructions exemplified by block 710 (e.g., here identified as block 710'). For example, computer 120 may identify any bridges 24 which are not in the desired (this time 'stowed') position. As discussed above, maintenance may be performed if any bridges 24 do not move from the deployed position to the stowed position. If, however all bridges 24 are stowed, then process 700 may end.

Process 700 was described according to a boarding implementation. It should be appreciated that, like process 600, process 700 may be executed as an autonomous unboarding process as well.

Thus, there has been described a vehicle loading and unloading system that includes a server, a wireless network of communication devices, and one or more vehicles. The communication devices may form part of transport carriages or part of a vehicle loader. According to an example, at least one device is located on a bridge that spans a gap between respective carriages or between a carriage and the loader. And the system may be used to facilitate the autonomous boarding and/or unboarding of vehicles.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
controlling, using a computer in a vehicle, an approach to a pivotable bridge that spans between two transport carriages or between one of the carriages and a vehicle loader;
receiving at the computer, from a communication device coupled to the bridge or one of the carriages, an indication to cross the bridge; and
based on the indication, instructing a powertrain and steering system, in the vehicle, to move the vehicle to thereby cross the bridge.

2. The method of claim 1, wherein the computer is programmed to operate the vehicle in a fully autonomous mode.

3. The method of claim 1, wherein the two transport carriages are railroad cars.

4. The method of claim 1, wherein the communication device is carried by a contact region of the bridge.

5. The method of claim 1, wherein the communication device comprises a chipset which transmits the indication, wherein the chipset is configured to communicate using a low-energy, peer-to-peer short-range wireless communication link.

6. The method of claim 1, wherein the indication is received at the computer based on proximity sensor data that indicates contact between the one of the carriages and the bridge in a deployed position.

7. The method of claim 1, wherein the indication further comprises a unique identifier.

8. The method of claim 1, further comprising determining to cross the bridge based on an indication that the bridge is in a deployed position.

9. The method of claim 1, further comprising: to inventory the vehicle, transmitting a vehicle identifier to a server in communication with the communication device.

10. A computer, comprising:
a processor; and
memory, wherein the memory stores instructions, wherein the instructions are executable by the processor, wherein the instructions comprise to:
control an approach of a vehicle to a pivotable bridge that spans between one of: two transport carriages, or a vehicle loader and one of the carriages;
receive, from a communication device coupled to the bridge or one of the carriages, an indication to cross the bridge; and based on the indication, instruct a powertrain and steering system, in the vehicle, to move the vehicle thereby crossing the bridge.

11. The computer of claim 10, wherein the instructions further comprise to operate the vehicle in a fully autonomous mode.

12. The computer of claim 10, wherein the two transport carriages are railroad cars.

13. The computer of claim 10, wherein the communication device is carried by a contact region of the bridge.

14. The computer of claim 10, wherein the communication device comprises a chipset which transmits the indication, wherein the chipset is configured to communicate using a low-energy, peer-to-peer short-range wireless communication link.

15. The computer of claim 10, wherein the indication is received at the computer based on proximity sensor data that indicates contact between the one of the carriages and the bridge in a deployed position.

16. The computer of claim 10, wherein the indication further comprises a unique identifier.

17. The computer of claim 10, wherein the instructions further comprise to determine to cross the bridge based on an indication that the bridge is in a deployed position.

18. The computer of claim 10, wherein the instructions further comprise to inventory the vehicle, transmitting a vehicle identifier to a server in communication with the communication device.

19. A system, comprising:
a computer, comprising:
  a processor; and
  memory, wherein the memory stores instructions, wherein the instructions are executable by the processor, wherein the instructions comprise to:
    control an approach of a vehicle to a pivotable bridge that spans between one of: two transport carriages, or a vehicle loader and one of the carriages;
    receive, from a first communication device coupled to the bridge or one of the carriages, an indication to cross the bridge; and
    based on the indication, instruct a powertrain and steering system, in the vehicle, to move the vehicle thereby crossing the bridge; and
a server programmed to:
  determine a location of the vehicle based on communication between the vehicle and a plurality of communication devices which include the first communication device, wherein each of the plurality of communication devices is coupled to a different bridge.

20. The system of claim 19, further comprising a vehicle loader comprising one of the plurality of communication devices coupled to a loader bridge thereof, wherein, when the loader bridge is in a deployed position, the loader bridge facilitates the vehicle to be loaded or unloaded from one of the carriages.

* * * * *